Patented Sept. 24, 1935

2,015,137

UNITED STATES PATENT OFFICE 2,015,137

VARNISH

Robin Bruce Croad, Liverpool, England, assignor to Howroyd, McArthur and Company Limited, Liverpool, England, a British company No Drawing. Application September 8, 1933, Serial No. 688,699. In Great Britain September 13, 1932

5 Claims. (Cl. 134—26)

This invention relates to improvements in plastic masses and in paintable compositions which term includes varnishes, paints, lacquers, enamels or the like.

It is the object of the invention to prepare novel paintable compositions and to provide certain novel resinous materials and methods for preparing them.

To this end the varnishes may be made for example by condensing two molecular proportions of a phenolic body with one molecular proportion of formaldehyde in a solution which is more alkaline than corresponds with a pH of 5 or alternatively which is feebly or slightly alkaline towards the indicator Alizarin Red S and then dissolving the resultant resin in an organic solvent. It is an advantage of the invention that cheap solvents can be employed.

A further feature of the invention consists in the use of sodium acetate as a catalyst.

A further feature consists in treating the condensed product, preferably while still moist, with an oil as hereafter described.

A further feature consists in heating the condensed product, preferably while still moist, with castor oil or linseed oil to produce oil-soluble products.

A further feature consists in an oil soluble resinous mass consisting of the reaction product of castor oil or linseed oil and a condensate of two molecular proportions of a phenolic body and one molecular proportion of formaldehyde.

A further feature consists in a paintable composition containing an oil soluble resinous body derived from the condensation product of two molecular proportions of a phenolic body and one molecular proportion of formaldehyde, dissolved in an oil preferably a drying oil such as linseed oil.

Suitable phenolic compounds are commercial cresylic acid, preferably that having a B.P. of 192° C. to 205° C. or phenols, or xylenols.

Suitable catalysts are sodium acetate but other salts of a strong base and a weak acid may be used e. g. sodium carbonate or silicate. Caustic soda may be used but it is not preferred as it gives dark products. Among suitable solvents may be mentioned alcohols such as butyl alcohol cellosolve, xylol, decaline, trichlorethylene or mixed solvents such as a mixture of butyl alcohol with toluol or trichlorethylene.

Suitable oils are castor oil, raw linseed oil, or tung oil but the two former are preferred.

Example 1

Mix two molecular parts of commercial cresylic acid with 1 molecular part of formaldehyde (as 40% aqueous solution). Then add sodium acetate until the mixture is faintly alkaline to Alizarine Red S; the mixture should turn this indicator from yellow to red or even purple. The quantity of sodium acetate required varies somewhat as the formaldehyde is usually slightly acid. About ½ to 1% by weight (calculated on the amount of cresylic acid) will generally suffice.

After heating till the reaction is complete, the resin may be dried and dissolved in a mixture of 5% butyl alcohol 95% toluol.

Example 2

A wet resin is prepared as in Example 1 and about 25–35% of tung oil is mixed with it, preferably without drying the resin first. The mixture is then dried in vacuo or open pan or by passing carbon dioxide through the mass and heating to 180° C. when a clear very viscous resin is obtained. The solution in a mixture of 5% butyl alcohol and 95% toluol gives a varnish, which when applied to wood, metal, glass etc. forms quickly drying clear films.

If the mixture of resin and oil is heated to 240° C. the resin is harder and more brittle.

Example 3

A resin is prepared as in Example 1 and when the reaction is complete but before drying 30 to 35% of castor oil or 25% of raw linseed oil is added and the mixture then dried, by heating it either under vacuum or while blowing carbon dioxide through it, until it becomes brittle. The resulting resin is soluble in raw linseed oil, tung oil, stand oil and boiled oil.

The quantity of castor oil or raw linseed oil which is mixed with the wet resin may be varied somewhat but larger quantities than those indicated result in a softer final resin.

If the resin is dark coloured, a small quantity of an organic acid such as citric acid may be added after drying e. g. when the resin has cooled to about 200° C.

In preparing further quantities of resin by the method described in this example it has been found advantageous to add about 3% of finished resin from a previous operation to the reaction mixture e. g. dissolved in the cresylic acid. This tends to regulate the reaction and increase the solubility of the finished product in oil.

*Example 4*

Add 15% of glycerol to the mixture of resin and oil as in Example 1 and heat to 240°–250° C. A brittle resin is obtained.

*Example 5*

Take the solid resin of Example 2 and heat under a reflux condenser with 60% of its weight of acetic anhydride. Bubble moist air through the molten mass. After the reaction is complete the mass is dried until a hard brittle resin results.

The product dissolves in organic solvents giving varnishes forming films which are light fast. This product is valuable since it is compatible with cellulose esters. Resins made as by Example 5 are also compatible with stand, blown or boiled linseed oils and tung oil.

In the preceding examples the condensation is preferably effected under light pressure e. g. about 10 lbs. Heating under a reflux may be employed but this as a rule requires a longer time.

When the claims refer to molecular proportions, it is understood that these are approximate and not rigid. The ratio of hydroxy body to formaldehyde is 2 to 1 or nearer to that ratio than the ratios heretofore employed in the varnish art, e. g. 1 to 1.

I declare that what I claim is:—

1. The process of producing oil-soluble resins which consists in condensing about two molecules of a phenol with one molecule of formaldehyde in presence of an aqueous solution which is faintly alkaline to Alizarin Red S, and heating the condensation product with a fatty oil.

2. The process of producing oil-soluble resins which consists in condensing about two molecules of a phenol with one molecule of formaldehyde in presence of an aqueous solution which is faintly alkaline to Alizarin Red S and heating the wet resin so formed with a fatty oil.

3. An oil-soluble resin obtained by heating two molecules of a phenol with one molecule of formaldehyde in presence of a faintly alkaline acetate catalyst and heating the condensation product with a fatty oil.

4. A composition of matter consisting of an oil-soluble resin consisting of the resin formed by condensing two molecules of a phenol with one molecule of formaldehyde in a faintly alkaline acetate solution, with which resin a fatty oil has been incorporated.

5. A paint, lacquer or varnish consisting of the resin of claim 3 dissolved in an organic solvent.

ROBIN BRUCE CROAD.